US012639926B2

(12) United States Patent
Adolf et al.

(10) Patent No.: US 12,639,926 B2
(45) Date of Patent: May 26, 2026

(54) MACHINE LEARNING-BASED GENERATION OF RULE-BASED CLASSIFICATION RECIPES FOR INSPECTION SYSTEM

(71) Applicant: 3M INNOVATIVE PROPERTIES COMPANY, St. Paul, MN (US)

(72) Inventors: Jeffrey P. Adolf, Rochester, MN (US); Steven P. Floeder, Shoreview, MN (US); Samuel S. Schreiner, New Brighton, MN (US); Scott P. Daniels, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 397 days.

(21) Appl. No.: 18/268,834

(22) PCT Filed: Dec. 23, 2021

(86) PCT No.: PCT/IB2021/062258
§ 371 (c)(1),
(2) Date: Jun. 21, 2023

(87) PCT Pub. No.: WO2022/144722
PCT Pub. Date: Jul. 7, 2022

(65) Prior Publication Data
US 2024/0046617 A1 Feb. 8, 2024

Related U.S. Application Data

(60) Provisional application No. 63/131,173, filed on Dec. 28, 2020.

(51) Int. Cl.
*G06V 10/764* (2022.01)
*G06T 7/00* (2017.01)
(Continued)

(52) U.S. Cl.
CPC .......... *G06V 10/765* (2022.01); *G06T 7/0004* (2013.01); *G06V 10/772* (2022.01);
(Continued)

(58) Field of Classification Search
None
See application file for complete search history.

(56) References Cited

U.S. PATENT DOCUMENTS 6,697,516 B1    2/2004  Alexandre
7,542,821 B2    6/2009  Floeder et al.
(Continued)

FOREIGN PATENT DOCUMENTS

WO         2022144733 A1     7/2022

OTHER PUBLICATIONS

International Search Report received for PCT International Application No. PCT/IB2021/062258, mailed on May 19, 2022, 5 pages.
Wang, "Interpreting Deep Learning Model Using Rule-based Method", 2020, Cornell University, pp. 1-9. XP081787364.

*Primary Examiner* — Leon Flores
(74) *Attorney, Agent, or Firm* — Ann Benjamin; Philip P. Soo

(57) ABSTRACT

Machine learning-based systems are described for automatically generating an inspection recipe that can be utilized when inspecting web materials, sheet parts or other products for defects. One example method for generating an inspection recipe includes assigning, by processing circuitry, a pseudo-label to each image of a plurality of images based on the content of the image and a labeling model, and storing the pseudo-labeled images in a second set of images; extracting, by the processing circuitry, one or more features from each image of the plurality of images, and storing the one or more features as a feature list for the image; generating, by the processing circuitry, a decision tree based on the second set of images and the feature lists of the second (Continued)

set of images; generating, by the processing circuitry, an inspection recipe based on the decision tree, the inspection recipe comprising a plurality of classification rules; and outputting the inspection recipe.

20 Claims, 8 Drawing Sheets

(51) Int. Cl.
    *G06V 10/772*         (2022.01)
    *G06V 10/774*         (2022.01)
    *G06V 10/82*          (2022.01)

(52) U.S. Cl.
    CPC ............ *G06V 10/774* (2022.01); *G06V 10/82* (2022.01); *G06T 2207/20081* (2013.01); *G06T 2207/30108* (2013.01)

(56)            References Cited

U.S. PATENT DOCUMENTS

| | | |
|---|---|---|
| 9,053,390 B2 | 6/2015 | Mahadevan et al. |
| 9,310,316 B2 | 4/2016 | Wu et al. |
| 9,879,977 B2 | 1/2018 | Shchegrov |
| 10,467,502 B2 | 11/2019 | Ren et al. |
| 10,650,508 B2 | 5/2020 | Chang et al. |
| 2012/0038775 A1* | 2/2012 | Priesterjahn .......... G07F 19/207 |
| | | 348/150 |
| 2018/0018590 A1 | 1/2018 | Szeto et al. |
| 2018/0149603 A1 | 5/2018 | Bhattacharyya et al. |
| 2018/0243800 A1 | 8/2018 | Kumar et al. |
| 2020/0005069 A1 | 1/2020 | Wang et al. |
| 2020/0019938 A1 | 1/2020 | Wang et al. |
| 2020/0020092 A1 | 1/2020 | Fang et al. |
| 2020/0160083 A1 | 5/2020 | Zhu et al. |
| 2022/0050061 A1* | 2/2022 | Bar .................... G01N 21/9501 |

* cited by examiner

MACHINE LEARNING-BASED GENERATION OF RULE-BASED CLASSIFICATION RECIPES FOR INSPECTION SYSTEM

CROSS REFERENCE TO RELATED APPLICATIONS

This application is a national stage filing under 35 U.S.C. 371 of PCT/IB2021/062258, filed Dec. 23, 2021, which claims the benefit of Provisional Application No. 63/131, 173, filed Dec. 28, 2020, the disclosure of which is incorporated by reference in its/their entirety herein.

BACKGROUND

Inspection systems for the analysis of moving web materials have proven critical to modern manufacturing operations. Industries as varied as metal fabrication, paper, nonwovens, and films rely on these inspection systems for both product certification and online process monitoring. Inspection systems typically utilize data analysis processes that attempt to discriminate good product from defective product. The data analysis process is often referred to as an inspection "recipe." For a given product, an inspection recipe typically defines the operations used to automatically identify and classify defects in product.

SUMMARY

In general, this disclosure describes machine learning-based techniques for automatically generating an inspection recipe that can be utilized when inspecting web materials, sheet parts or other products for defects. The techniques described herein include unique deep learning and other machine learning algorithms and enable the automated creation of improved inspection recipes.

Traditionally, inspection recipes are configured by human experts using a combination of empirical data and experience. Unfortunately, the accuracy of an inspection recipe is highly dependent on the expert's capability. In addition, current inspection systems can generate huge amounts of data. Thus, inspection recipes developed by an expert may be sub-optimal because only a small portion of existing data can typically be managed by a single person. For example, a process expert may curate a relatively small dataset on the order of 100-500 images and manually labels the images as "defective" or "okay." An inspection expert can use an image analysis program (e.g., Matrox inspector or ImageJ) to extract a list of traditional features for each image. Such features typically include height, width, mean intensity, etc. The inspection experts can utilize some or all of the extracted features along with threshold values for the features to create an inspection recipe. The inspection expert can load the inspection recipe into a production system and can audit the results to determine the efficacy of the inspection recipe. The aforementioned process can be repeated until the inspection recipe is satisfactory to the inspection expert. The aforementioned process can be very time-consuming. Further, inspection recipe accuracy is highly dependent on the selected set of images and the inspection expert's capability.

Some current systems attempt to automatically generate inspection recipes through analysis of defect image attributes. However, such attempts have been typically unsuccessful due to the inability to generate accurate inspection recipes in situations where only limited data is available to the system, and the susceptibility of conventional algorithms to overfitting due to sensitivity of the algorithms to small variations in the training data. Overfitting, for example, occurs when a set of rules are developed that may be fairly specific and produce acceptable results when applied to a training set of data, but fail to provide reliable results when additional scenarios are encountered in a larger set of data.

As described herein, an inspection recipe generation system can generate an inspection recipe using particular machine learning techniques that leverage a machine learning model created using relatively few images (e.g., less than 100 images) that has been trained using supervised learning techniques to classify images. For example, training data set may be a relatively small set of images that have been labeled by subject matter experts as having a defect or not having a defect. The model may be trained to classify images with a first classification that indicates a defect is shown in the image data and a second classification that the image data does not show a defect. The trained model may then be used to apply labels, referred to as pseudo-labels, to image data for a relatively large set of unlabeled images (e.g., thousands of images) to create a pseudo-labeled set of image data. As an example, the pseudo-labeled set of image data. The labels applied by the trained model are referred to as "pseudo-labels" to reflect that the model may erroneously classify some images. Thus, the pseudo-label may not always reflect the ground truth.

The pseudo-labeled set of data may be used to generate a decision tree. In some aspects, the inspection recipe generation system generates a binary decision tree using the pseudo-labeled set of images. Nodes in the binary decision tree represent rules having two outcomes, true or false. Leaf nodes in the binary decision tree represent one of two classifications, defective or not defective. The binary decision tree can be used to generate an inspection recipe by traversing paths extending from leaf nodes to the root node of the binary decision tree. A rule can be generated at each node along the path. The generated rules can be used to create the inspection recipe. Upon determining that an inspection recipe is satisfactory, an administrator can deploy the rule to production line systems for use by inspection systems in classifying product used or made by the production line.

The techniques of this disclosure may provide at least one technical advantage. For example, it is generally beneficial to have a large set of image data when generating a decision tree. However, it is difficult and time consuming to generate such a set of data using current system. Thus, one technical advantage is that an accurate decision tree can be generated more quickly and more efficiently than in current system. Because the inspection recipe generation system uses a large set of pseudo-labeled image data, the decision tree is less susceptible to overfitting as in current systems. A practical application of the techniques described herein is an inspection recipe generation system that can generate inspection recipes that can be used by existing inspection systems to accurately classify webs, sheet parts and/or piece parts.

In one example, this disclosure describes a method for generating an inspection recipe that includes assigning, by processing circuitry, a pseudo-label to each image of a plurality of images based on the content of the image and a labeling model, and storing the pseudo-labeled images in a second set of images; extracting, by the processing circuitry, one or more features from each image of the plurality of images, and storing the one or more features as a feature list for the image; generating, by the processing circuitry, a decision tree based on the second set of images and the feature lists of the second set of images; generating, by the processing circuitry, an inspection recipe based on the decision tree, the inspection recipe comprising a plurality of classification rules; and outputting the inspection recipe.

In another example, this disclosure describes a system for generating an inspection recipe that includes a pseudo-labeler comprising processing circuitry configured to assign a pseudo-label to each image of a plurality of images based on the content of the image and a labeling model, and store the pseudo-labeled images in a second set of images; a feature extractor comprising processing circuitry configured to extract one or more features from each image of the plurality of images, and store the one or more features as a feature list for the image; a decision tree generator comprising processing circuitry configured to generate a decision tree based on the second set of images and the feature lists of the second set of images; and an inspection recipe generator configured to generate an inspection recipe based on the decision tree and to output the inspection recipe, the inspection recipe comprising a plurality of classification rules.

In another example, this disclosure describes a computer-readable storage medium having stored thereon instructions executable by one or more processors to cause the one or more processors to: assign a pseudo-label to each image of a plurality of images based on the content of the image and a labeling model, and store the pseudo-labeled images in a second set of images; extract one or more features from each image of the plurality of images, and store the one or more features as a feature list for the image; generate a decision tree based on the second set of images and the feature lists of the second set of images; generate an inspection recipe based on the decision tree, the inspection recipe comprising a plurality of classification rules; and output the inspection recipe.

The details of at least one example of the disclosure are set forth in the accompanying drawings and the description below. Other features, objects, and advantages of the disclosure will be apparent from the description and drawings, and from the claims.

DETAILED DESCRIPTION

Systems and techniques are described herein for automatically generating an inspection recipe that may be used, for example, in an inspection system of a product line in a manufacturing facility. An inspection recipe generation system may automatically construct inspection recipes based on an automatically generated decision tree for classifying image data. The accuracy of inspection recipes generated can be nearly the same as or better than recipes generated manually, while significantly reducing the time and effort required to generate an inspection recipe. According to the techniques described herein, subject matter experts need only be involved with labeling a relatively small set of data, which can be used to automatically generate a high-fidelity machine learning model (referred to as an intermediate model). The inspection recipe generation system can use the intermediate model to label a large set of data with pseudo-labels. Additionally, the inspection recipe generation system calculates image features for images in the large data set. The pseudo-labels and image features can be used to generate a decision tree. In some examples, the inspection recipe generation system can use the decision tree to generate inspection recipes in a format that can be used by existing inspection systems. The techniques described herein may enable efficient generation of accurate inspection recipes for determining a quality for web materials, sheet parts and other products.

Figure 1:
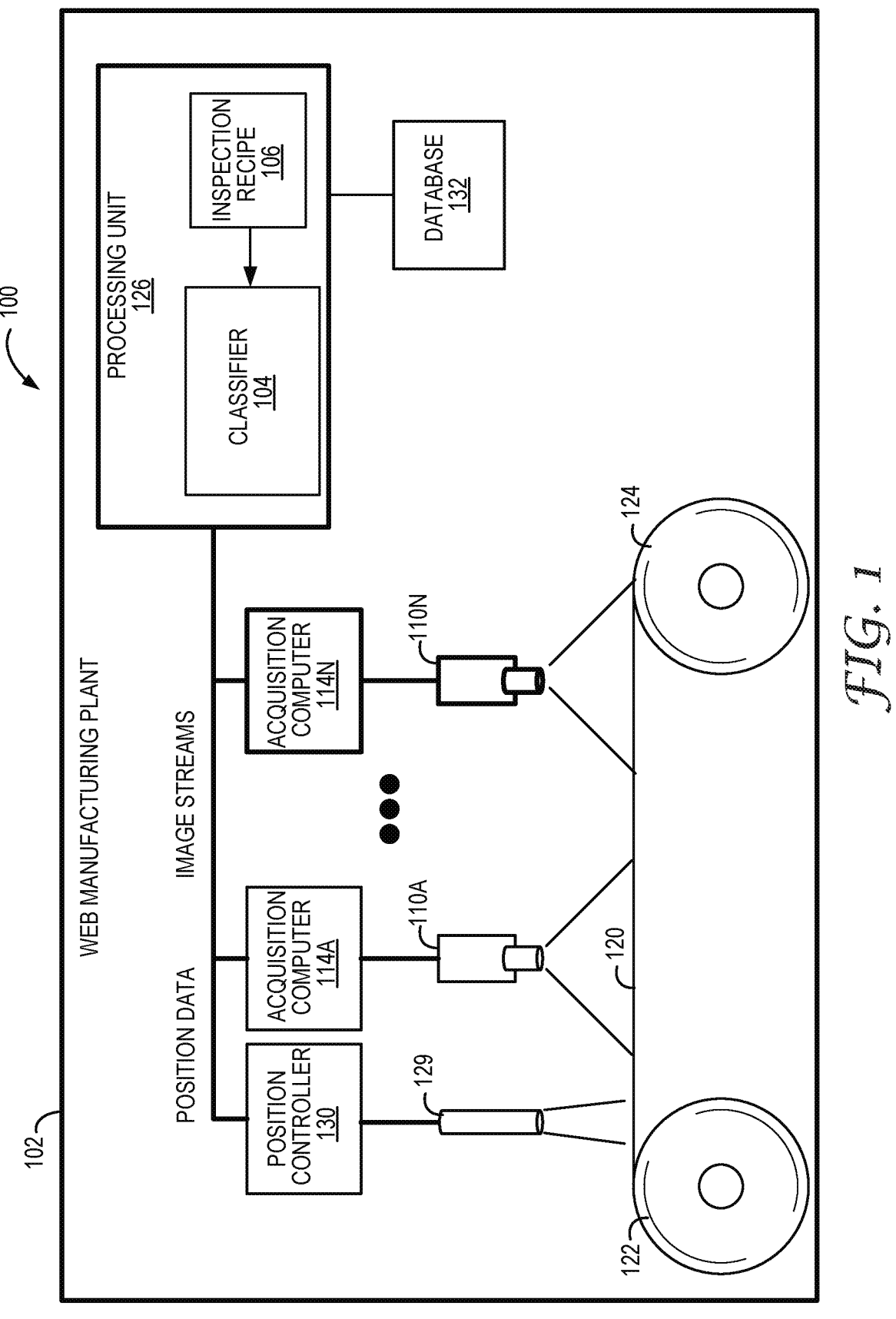
FIG. 1 is a block diagram illustrating an example embodiment of a process line of a web manufacturing plant that uses inspection recipes generated according to at least one example technique described in this disclosure.

FIG. 1 is a block diagram illustrating an example embodiment of a process line of a web manufacturing plant 102 that uses inspection recipes generated according to at least one example technique described in this disclosure. In the example of FIG. 1, a segment of a web 120 is positioned between two support rollers 122, 124. Image acquisition devices 110A-110N ("image acquisition devices 110") are positioned in proximity to the continuously moving web 120. Image acquisition devices 110 can scan sequential portions of the continuously moving web 120 to obtain image data. Acquisition computers 114 collect image data from image acquisition devices 110 and transmit the image data to processing unit 126 for analysis.

Image acquisition devices 110 may be conventional imaging devices that are capable of reading a sequential portion of the moving web 120 and providing output in the form of a digital data stream. As shown in FIG. 1, image acquisition devices 110 may be cameras that directly provide a digital data stream or an analog camera with an additional analog to digital converter. Other sensors, such as, for example, laser scanners may be utilized as the imaging acquisition device. Examples of devices suitable for acquiring the image include linescan cameras such as models from Dalsa (Waterloo, Ontario, Canada), or E2V (Chelmsford, United Kingdom).

The image may be optionally acquired through the utilization of optic assemblies that assist in the procurement of the image. The assemblies may be either part of a camera or may be separate from the camera. Optic assemblies utilize reflected light, transmitted light, or transflected light during the imaging process. Reflected light, for example, is often suitable for the detection of defects caused by web surface deformations, such as surface scratches.

Position controller 130 controls position mark reader 129 to collect roll and position information from web 120. For example, position mark controller may include one or more photo-optic sensors for reading position marks such as bar codes, fiducial marks or other position indicia from web 120. In addition, position controller 130 may receive position signals from one or more high-precision encoders engaged with web 120 and/or rollers 122, 124. Based on the position signals, position controller 130 determines position information for each detected position mark. For example, position controller 130 may produce position information locating each detected position mark within a coordinate system applied to the process line. Alternatively, processing unit 126 may place each of the detected position marks within the coordinate system based on the position data received from position controller 130. In this case, the position data provided by position controller 130 may represent distances between each position mark in a dimension along the length of web 120. In either case, position controller 130 communicates the roll and position information to processing unit 126.

Processing unit 126 processes image streams from acquisition computers 114. Classifier 104 can receive the image streams and utilize inspection recipe 106 to classify portions of web 120 as being defective, non-defective, or other classification. Classifier 104 can execute the operations in inspection recipe with respect to an image of the image streams in order to classify the portion of the web 120 that corresponds to the image. The operations can comprise rules that are applied to the image data. For example, a set of one or more rules may be applied to the image data to determine if a defect is present in web 120, and to classify the portion of the web 120 that corresponds to the defect accordingly. Each of the rules can define an action and at least one condition having criteria for determining whether the action is to be executed. As an example, the condition may define filter criteria for filtering images that do not meet the filter criteria. The filter criteria can be expressed in terms of attributes of the image data obtained via image data analysis (e.g., image_area>621). The action can be accepting the image and passing the image data to a next rule or rules, or applying a pseudo-label to the data. Techniques used to generate inspection recipe 106 will be further described below. Images that do not meet the filter criteria can be rejected, which in some aspects results in no further processing of the image according to the decision tree.

Based the position data produced by position controller 130, processing unit 126 determines the spatial position of each detected defect within the coordinate system of the process line. That is, based on the position data from position controller 130, processing unit 126 determines the x-y and possibly z position for each anomaly within the coordinate system used by the current process line. For example, a coordinate system may be defined such that the x dimension represents a distance across web 120, a y dimension represents a distance along a length of the web, and the z dimension represents a height of the web, which may be based on the number of coatings, materials or other layers previously applied to the web. Moreover, an origin for the x, y, z coordinate system may be defined at a physical location within the process line and is typically associated with an initial feed placement of the web 120. The coordinate system defined for the current process line may not be (and is typically not) the same coordinate system for any previous or subsequent processes applied to web 120.

Processing unit 126 records in database 132 the spatial location of each detected defect with respect to the coordinate system of the process line, this information being referred to herein as local defect information. Other process variables may be stored in database 132 as well. That is, processing unit 126 stores the local defect information for web 120, including roll information for the web 120 and position information for each detected defect, within database 132. The local defect information generated for the current process line may be subsequently spatially registered with local defect information generated by the other process lines for the same web. Further details regarding registration of local defect information may be found in U.S. Pat. No. 7,542,821 entitled "MULTI-UNIT PROCESS SPATIAL SYNCHRONIZATION OF IMAGE INSPECTION SYSTEMS," filed Jul. 26, 2007 which is hereby incorporated by reference herein.

In some aspects, image data from the image data stream may be stored in database 132. The stored image data may be used as part of training an inspection recipe generator as will be described below.

Figure 2:
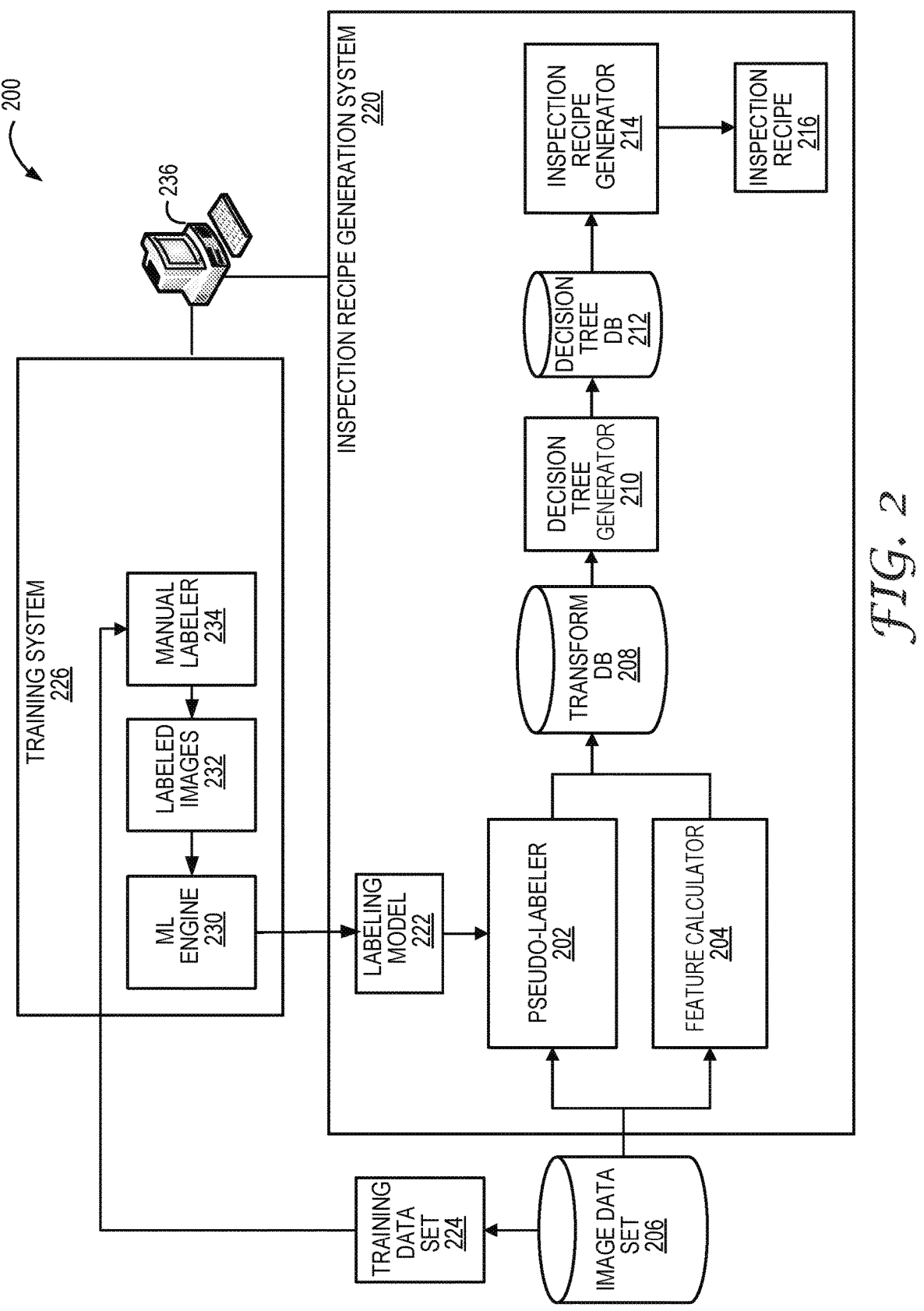
FIG. 2 is a block diagram illustrating an example system for generating inspection recipes, in accordance with at least one example technique described in this disclosure.

FIG. 2 is a block diagram illustrating an example system 200 for generating inspection recipes, in accordance with at least one example technique described in this disclosure. In some aspects, system 200 includes an inspection recipe generation system 220 having a pseudo-labeler 202, feature calculator 204, decision tree generator 210 and inspection recipe generator 214. Inspection recipe generation system 220 can receive as input images from image data set 206. Image data set 206 can be a set of images for a product or raw material for a product, where the images may or may not have defects shown in the image data. Some or all of the images in image data set 206 can be unlabeled images. For the purposes of the disclosure, "unlabeled image" refers to an image that has not been classified according to the techniques described herein. The image may be labeled using other labels, including labels used to validate or verify test results. In some aspects, image data set 206 can be a controlled image population where images are selected for inclusion (either manually or automatically) in the image data set 206 based on some selection criteria. For example, the controller image population may be a set of images selected from images obtained from inspection systems on production lines for a product. Details on a system for selecting images for inclusion in a controlled image population are provided in co-filed, copending U.S. Provisional Patent Application Ser. No. 63/131,166, entitled "ACTIVE LEARNING MANAGEMENT SYSTEM FOR AUTOMATED INSPECTION SYSTEMS", which is hereby incorporated by reference.

The image data set 206 is initially processed by pseudo-labeler 202 and feature calculator 204. Pseudo-labeler 202 can utilized a machine-learned labeling model 222 that applies a "pseudo-label" to the image that represents labeling model 222's classification of the image. The term "pseudo-label" is used to differentiate the applied label that is determined via a machine-learning model (pseudo-labeler 202) from labels that have been manually applied based on the ground truth (e.g., a label determined by direct observation). In some aspects, pseudo-labeler 202 labels images to indicate that the product shown in the image is defective (e.g., a label of "true", "T", "defective", "no good", "NG", etc.) or not defective (e.g., a label of "false", "F", "okay", "OK", "not defective" etc.). Because machine-learning models are rarely 100% correct, there may be some images where the pseudo-label does not match the ground truth label. However, a technical advantage of the techniques described herein is that satisfactory classification results can be achieved using a set of pseudo-labeled images that may be mostly correct and that does not need to be perfectly labeled with respect to the ground truth.

While pseudo-labeler 202 may be implemented using any machine-learned labeling model 222 that can classify images into a positive or negative class may be utilized, in some aspects, labeling model 222 is a convolutional neural network (CNN). Examples of such CNNs include Tensor-Flow available as open source software and Cognex ViDi available from Cognex corporation.

Labeling model 222 may be created by training system 226. Training system 226 can obtain a relatively small training data set 224 from image data set 206. As an example, a user may utilize a user interface device 236 to query or scan image data set 206 and select images for inclusion in training data set 224. In some aspects, training data set 224 may have 100 images. The user may utilize user interface device 236 to apply labels to the training data set 224 using manual labeler 234 to create labeled images 232.

Machine learning engine 230 may train labeling model 222 using the manually labeled images 232. For example, machine learning engine 230 may utilize conventional machine-learning methodologies to train labeling model 222 based on the labeled images 232. Training system 226 may deploy labeling model 222 to inspection recipe generation system 220 for use by pseudo-labeler 202. Thus, training system 226 can generate a "high-fidelity" labeling model 222 based on a relatively small set of manually labeled images 232. As noted above, in some aspects, labeling model 222 can be, but is not limited to, a CNN.

Feature calculator 204 extracts features from the image data and creates a feature vector for the image data. In some aspects, feature calculator 204 transforms the image to a binary form ("binarizes" the image), where each pixel of the image is either black or white using a user-specified threshold intensity to determine the pixel value for the image. As an example, feature calculator 204 can binarize an 8-bit grayscale image based on a user-defined intensity threshold. This threshold can be single-sided (e.g. <=100) or it can be ranged (e.g. out of the range 50 to 200). The binarized image can be "blobbed" to extract a list of unique connected contiguous features, e.g., regions in the image data having pixels that are connected. In some aspects, blobbing may be performed utilizing an optional user specified minimum size requirement. For each contiguous image feature (e.g., each blob), image features such as height, width, area, principal axis angle, mean intensity, intensity standard deviation, etc. can be calculated. The result of this process is a list of features per blob per image. The list of features may be referred to as a feature vector from the image. The length of this list of features is dependent on the number of blobs extracted from the binarized image and can be anywhere from zero to dozens or even hundreds. For example, there may be five different feature widths calculated from an image A having five blobs, and none from an image B having zero blobs, where image B may be from the same image data set as image A.

Feature calculator 204 may use one or more other heuristics in addition to, or instead of the above described heuristic to create a list of features for an image. For example, the feature list may include raw pixel values for the image. The feature list may include statistical measures of the image, for example, various means, medians, standard deviations etc. of feature characteristics. The feature list may include a feature space determines using fast Fourier transform (FFT) techniques. The feature list may include a local binary pattern (LBP) feature list. The feature list may include a histogram of oriented gradients (HOG). The feature list may include features as determined by a scale-invariant feature transformation (SIFT). The feature list may include the output of a low-level convolutional layer extracted from a pre-trained convolutional neural network (CNN). In general, the feature list may include features as determined by computer vision feature extraction heuristics now known or developed in the future.

Pseudo-labeler 202 and feature calculator 204 each store their respective output in transform database 208. That is, pseudo-labeler 202 stores the label assigned by pseudo-labeler 202 and feature calculator 204 stores the feature list for the image in transform database 208. The label and feature list may be stored along with an association to the image data for the label and feature list.

Decision tree generator 210 receives the labels and feature lists from transform database 208. Decision tree generator 210 can then create a decision tree based on the labels and feature lists for the images. In some aspects, decision tree generator 210 utilizes the same features that will be used by an inspection system of a production line to generate the decision tree. In some aspects, decision tree generator 210 constructs a decision tree in a greedy fashion, using the image feature and threshold that yield the largest information gain at each node of the tree.

In some implementations, transform database 208 may include labels for the images that have been labeled by pseudo-labeler 202 and labels that have also been manually labeled. In such cases, decision tree generator 210 will give precedence to the manually applied label over a pseudo-label.

Decision tree generator 210 can be configured with various hyperparameters that can affect the performance of a decision tree generated according to the hyperparameters. Such parameters include test/train split, maximum tree depth, minimum leaf size, and positive class weighting. In some aspects, a user may be prompted via a user interface (not shown) to provide one or more of the hyperparameters.

The test/train split parameter specifies the fraction of the image dataset used for training the tree versus testing the tree. The images set aside for testing are not used in the creation of the tree, and therefore can provide a reasonable estimate of the tree's generalized accuracy. For example, the generated decision tree can be applied to images in the test set to determine accuracy of the decision tree. Setting aside this test set can aid in ensuring that the resulting decision tree has not been overfit to the training data. As an example, the test/train split may be set to a value of 0.2 test/0.8 train to 0.5 test/0.5 train.

The maximum tree depth parameter specifies the maximum number of nodes allowed between the root of the decision tree to a leaf (D). In general, a large tree depth will better fit the data to the training set. However, a tree with too large a depth runs the risk of overfitting and losing generalized performance to new images in production. As an example, the maximum tree depth may be set to a value in the range of four to six.

The minimum leaf size parameter specifies the minimum number of samples (N) allowed in a tree leaf. During training, if any parent node split creates a leaf that contains less than N training samples, the leaves will be pruned and the parent node is converted to a leaf. As an example, a minimum leaf size where N=5 means that there will be only five samples that define a rule, whereas a minimum leaf size of N=1000 would require much more "evidence" to make that decision. The minimum leaf size hyperparameter can be set to a value that can reduce overfitting the decision tree. As an example, the minimum leaf size may be set to a value that is approximately 1-5% of the size of the training set.

The positive class weighting parameter specifies a weighting (W) for the samples in the positive class. Each positive sample is treated as W samples during training, which can increase or decrease the importance of accurately classifying defective images. By default, the weighting of the positive class is 1, indicating that the positive samples and negative samples should be considered equally important during training. A weighting greater than 1 can reduce the number of false negatives (misclassified defective images) and can increase the number of false positives, while a weighting less than 1 will do the opposite. This allows the user to control the tradeoff between "overmarks" (e.g., a false positive) and "undermarks" (e.g., a false negative) in the inspection recipes generated by decision tree generator 210. As an example, the positive class weighting parameter may be set to a value between 0.3 and 5 if the default value of one (1) is not used.

In order to maintain high production output, the inspection system of a production line needs to be able to rapidly process image data of product images during the production process. Thus, in some aspects, the maximum tree depth hyperparameter and the minimum leaf size hyperparameter may be set to values that are configured to avoid generating overly complex recipes that may reduce production throughput to an unacceptable level. For example, the maximum tree depth hyperparameter may be set to a relatively low value (e.g., lower than needed to prevent overfitting) and the minimum leaf size hyperparameter may be set to a relatively high value (e.g., higher than needed to prevent overfitting).

As noted above, user interface device 236 may be used to manually label images from training data set 224. Additionally, user interface device 236 may be used to control or configure aspects of the operation of inspection recipe generation system 220. For example, user interface device 236 may be used to provide hyperparameters, determine image data sources, image selection parameters, and other configuration parameters. Further, user interface device 236 may be used to view generated decision trees and the results applying decision trees to image data. In some aspects, user interface device 236 may be local to training system 226 and/or inspection recipe generation system 220. In other aspects, user interface device 236 may be remote from either or both training system 226 and inspection recipe generation system 220. For example, user interface device 236 may be communicably coupled to training system 226 and/or inspection recipe generation system 220 via a network such as a corporate intranet or the Internet.

Figure 3:
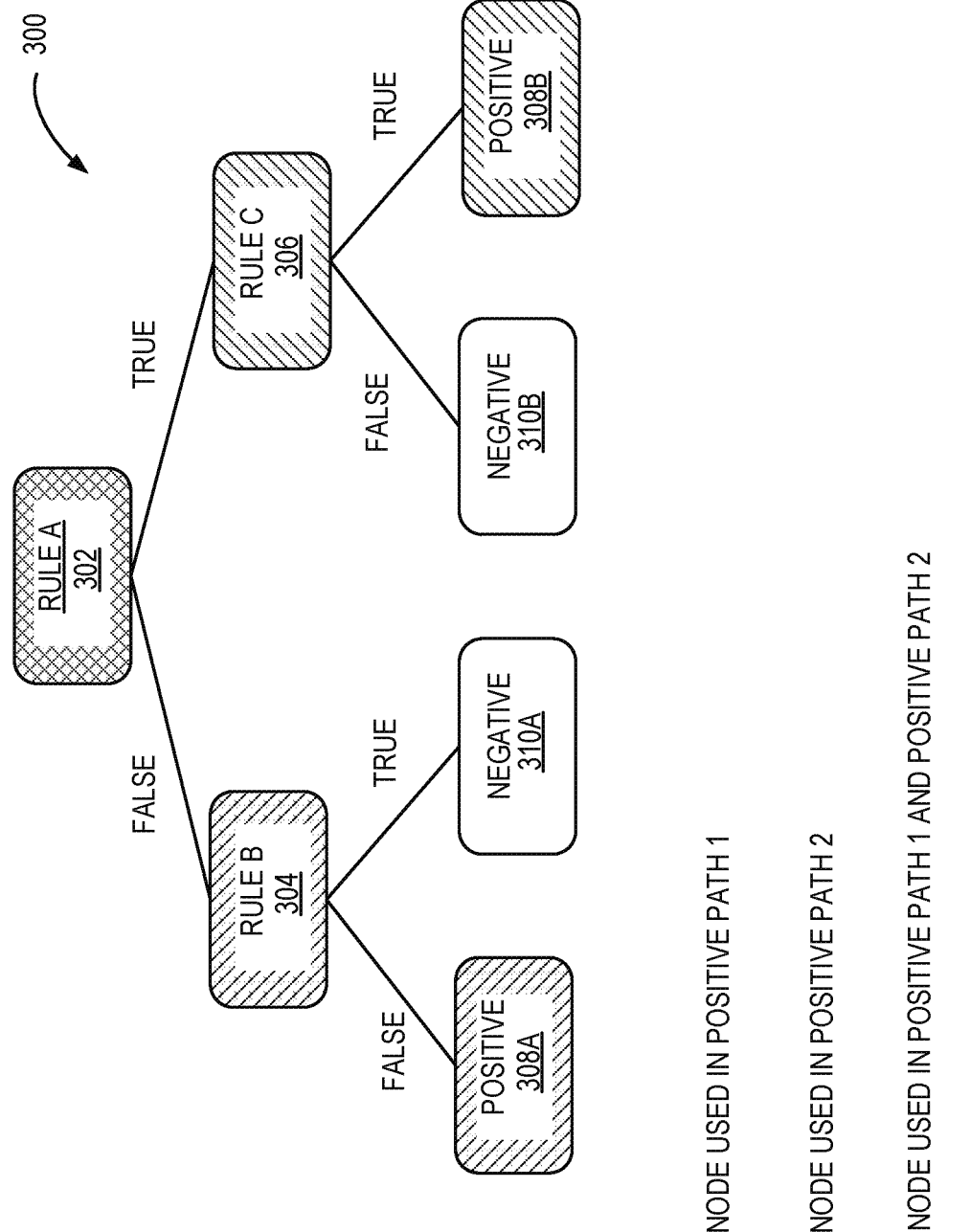
FIG. 3 illustrates an example graphical representation of a decision tree, in accordance with at least one example technique of the disclosure.

FIG. 3 illustrates an example graphical representation of a decision tree 300, in accordance with at least one example technique of the disclosure. In the example illustrated in FIG. 3, root node 302 and internal nodes 304 and 306 correspond to rules while leaf nodes 308 and 310 correspond to classifications based on the rules (e.g., positive node 308 and negative node 310). Edges in decision tree 300 are labeled "True" and "False." The "True" edge is followed if the rule evaluates to true, and the "False" edge is followed if the rule evaluates to false." Decision tree 300 is a relatively simple decision tree with few nodes. A decision tree can have a different number of nodes than that shown in decision tree 300, and can have many more nodes that decision tree 300.

Returning to FIG. 2, inspection recipe generator 214 is configured to compile a decision tree and transform the decision tree into an inspection recipe 216 representing the decision tree as a set of operations that may be applied by an inspection system. Inspection recipe 216 defines inspection rules that can be joined with set operations such as intersection and union. A positive path can be defined as the list of sequential rules that lead to a positive leaf (e.g. a defect is shown in the image data) of the decision tree. Inspection recipe generator 214 converts the decision tree to recipe 216 with set operations. In some aspects, inspection recipe generator 214 generates an intersection operation ("and") for each rule node within a positive path and a generates a union operation ("or") on all positive paths in the decision tree. In some aspects, the inspection recipe generator does not generate rules for rule nodes that are not along a positive path in the decision tree.

Figure 4:
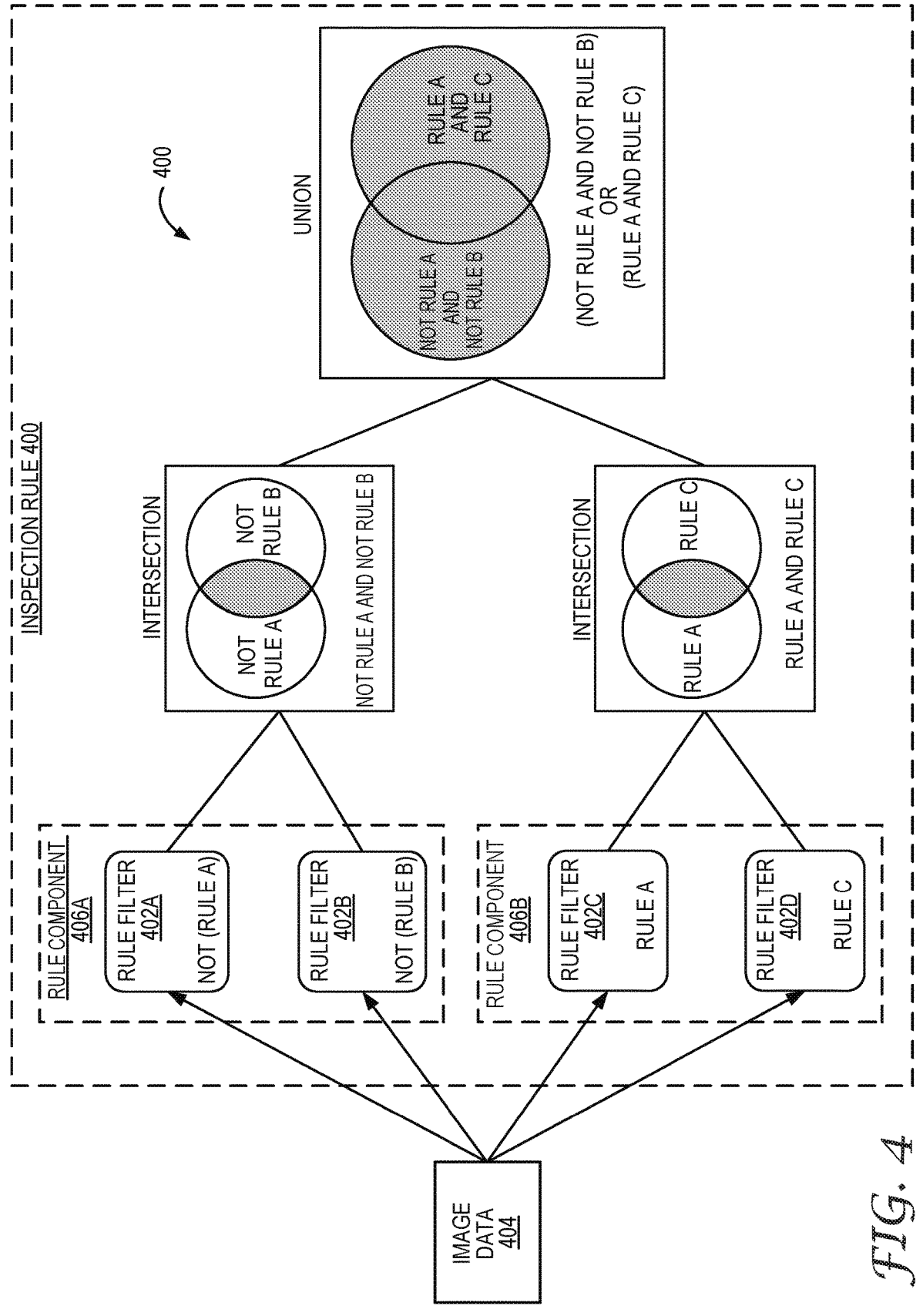
FIG. 4 illustrates an example graphical representation of an inspection recipe 500 generated from decision tree of FIG. 3, in accordance with at least one example technique of the disclosure.

FIG. 4 illustrates a more detailed example graphical representation of an inspection recipe 500 generated from decision tree 300 of FIG. 3, in accordance with at least one example technique of the disclosure. In this example, a first positive path in the decision tree 300 leads to positive node 308A via rule A node 302 along "False" edge to rule B node 304 and again along a "False" edge to positive node 308A. A second positive path in the decision tree 300 leads to positive node 308B via rule A node 304 along "True" edge to rule C node 306 and again along a "True" edge to positive node 308B. A first rule component comprises the intersection of the conditions along the first path, i.e., the conditions are joined with "and". This first component may be expressed as "not rule A and not rule B." A second rule component comprises the intersection of the conditions along the second positive path. This second component may be expressed as "rule A and rule C". The resulting rule is a union of the positive path components (e.g., an "or" of the components) and may be described as: if (not rule A and not rule B) or (rule A and rule C) then the image shows a defect in a product."

In some aspects, the decision tree comprises rule filters 402 that implement the rules. The same image data is provided to each filter 402, and if the image data matches the filter criteria, the image data is accepted and the image data is passed to the next level filters or set operations. Images that are rejected according to the filter criteria may not be processed any further. Rule components 406 comprise rules along a positive path. For example, rule component 406A includes rule filters 402A and 402B which correspond to rules 302A and 302B of the left-most positive path in the decision tree illustrated in FIG. 3, while rule component 406B includes rule filters 402C and 402D which correspond to rules 302A and 302C of the right-most positive path in the decision tree illustrated in FIG. 3.

Figure 5:
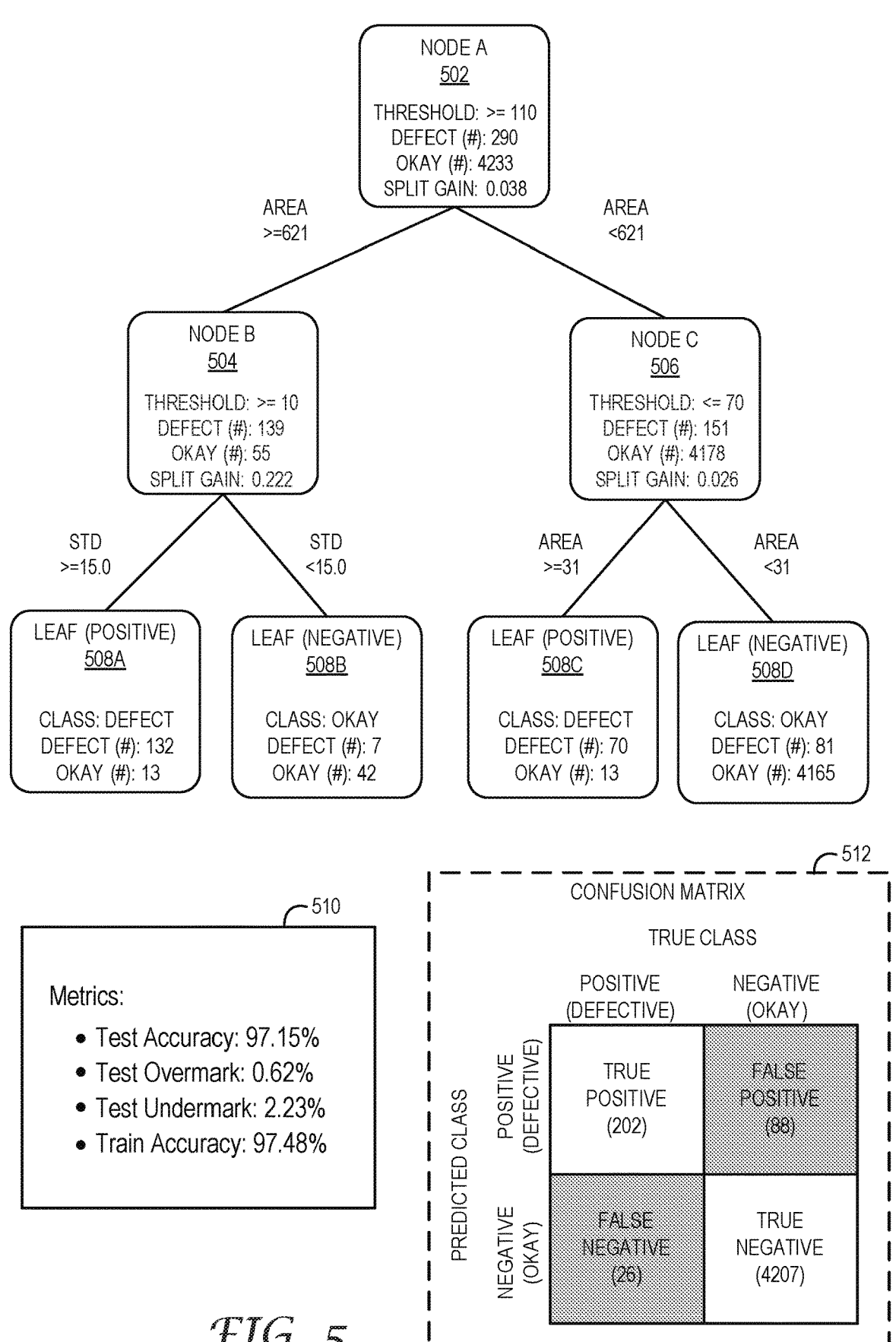
FIG. 5 illustrates an example of a decision tree and decision tree metrics that may be displayed via a user interface, in accordance with at least one example technique of the disclosure.

FIG. 5 illustrates an example of a decision tree and decision tree metrics that may be displayed via a user interface of inspection recipe generation system 220 (FIG. 2), in accordance with at least one example technique of the disclosure. In some implementations, a user can view the resultant decision tree generated by decision tree generator 210 via a user interface. In the example illustrated in FIG. 5, each node shows data regarding the image date set used to create the decision tree. The "threshold" value in each node indicates the user-specified intensity threshold used to binarize the image before feature extraction. In this example, there are 4523 labeled input images. As shown at node A 502, 290 of the images have been labeled as showing a defect and 4233 of the images have been labeled as Okay. Further, node A 502 shows a value "split gain" that represents the information gained by the using the rule parameters. Edges from node A 502 to node B 504 and node C 506 show a rule component that was generated based on the incoming image data. In the example illustrated in FIG. 5, image area is selected as the rule criteria. Images having a blob area greater than or equal to 621 are passed on to node B 504 for evaluation, and images having an area less than 621 are passed on to node C 506 for evaluation. At node A 502, the split gain value is 0.038. Nodes 504 and 506 display information regarding the evaluation at the respective nodes. As can be seen in the example of FIG. 5, the split gain of 0.222 of node B 504 is higher that the split gain of node C 506 (0.026) and node A (0.038), thus indicating that the rule component corresponding to node B 504 provides greater information gain than the other nodes. However, node B 504 also shows that the rule component applies to relatively few images (139+55=194 images) compared to the application of the rule component at node C 506 (151+4178=4329 images).

The leaf nodes 508 at the lowest level indicate a final image classification given the rule components specified by the edges. For example, leaf node 508A shows images classified as showing a defect according to the rule "if blob area greater than or equal to 621 and standard deviation greater than or equal to 15.0 then the image is classified as defect." Leaf node 508A shows that of the 145 images classified according to this rule, 132 had a label of "defect" and 13 had a label of "Okay." Leaf node 508B shows images classified as "Okay" according to the rule "if blob area greater than or equal to 621 and standard deviation greater less than 15.0 then the image is classified as Okay." Leaf node 508B shows that of the 49 images classified according to this rule, 7 had a label of "defect" and 42 had a label of "Okay." Leaf node 508C shows images classified as showing a defect according to the rule "if blob area less than 621 and blob area greater than or equal to 31 then the image is classified as defect." Leaf node 508C shows that of the 83 images classified according to this rule, 70 had a label of "defect" and 13 had a label of "Okay." Leaf node 508D shows images classified as showing a defect according to the rule "if blob area less than 621 and blob area less than 31 then the image is classified as Okay." Leaf node 508D shows that of the 4246 images classified according to this rule, 81 had a label of "defect" and 4165 had a label of "Okay."

The user interface of inspection recipe generation system 220 (FIG. 2) may present a confusion matrix 512 (sometimes referred to as an "error matrix") to aid the user in evaluating the decision tree. A confusion matrix illustrates the performance of the decision tree in terms of true positives, true negatives, false positives, and false negatives. In the example illustrated in FIG. 5, the decision tree correctly classified 202 of the 4233 input images as having defects (true positives) and correctly classified 4207 images as having no defects (true negatives). The decision tree incorrectly classified 88 images as having defects (false positive) and incorrectly classified 26 images as having no defects (false negative).

The user interface of inspection recipe generation system 220 (FIG. 2) may also present summary metrics 510 regarding decision tree performance. These metrics include test accuracy, test overmark, test undermark and training accuracy. In some aspects, test accuracy is an indicator the accuracy of the pseudo-labels applied to images in the test set of images (e.g., the test images held out according to the test/train split hyperparameter). In this aspect, the output label of the decision tree can be compared with the pseudo-label applied to the test image to determine accuracy of the decision tree. In some aspects, test accuracy may be an indication of the accuracy of the decision tree label when compared with other labels in the images that indicate what the "ground truth" label should be. For example, an image in a test set may include multiple labels, including a pseudo-label determined as described herein. As an example, a label may indicate "fiber defect" or "bubble defect." These other labels may be designated by a user as indicating a defect or not indicating a defect. Such a label may be compared with the label assigned according to the decision tree to determine accuracy. In this aspect, the accuracy can indicate an accuracy of the entire workflow of recipe generation system 220.

Test overmark is percentage of images that were incorrectly classified by the rules as being not defective (e.g., a false negative).

Test undermark is the percentage of images that were incorrectly classified by the rules as defective (e.g., a false positive).

Training accuracy is the percentage of images that were correctly classified by the model used by pseudo-labeler 202. Comparing the training accuracy to the test accuracy can be one way to determine if the inspection recipe exhibits overfitting.

Other binary classification metrics may be provided instead of, or in addition to those described above. Examples of such metrics include true positivity rate (TPR, also referred to as "sensitivity" or "recall"), true negative rate (TNR, also referred to as specificity), receiver operating characteristic, F-scores, etc.

The above-described metrics may be displayed in graphical form along with the generated decision tree. A user may use the information displayed with the decision tree and the metrics determine if the generated decision tree is acceptable. If the user indicates that the decision tree is acceptable, the decision tree generator 210 can store the decision tree in decision tree database 212.

Inspection recipe generator 214 can read a decision tree from decision tree database 212 and generate an inspection recipe 216 based on the decision tree. In some aspects, inspection recipe 216 can be an eXtensible Markup Language (XML) document. To produce inspection recipe 216, inspection recipe generator 214 can trace each positive leaf of the decision tree back to the root, aggregating each node split attribute (i.e. area>=621) into a list of filters that can be used to identify an image as showing a defect. Each decision tree node split corresponds to a given image threshold value and type (i.e. intensity>128). To improve the performance of the resultant defect algorithm, the threshold filters can be joined together so that they are only performed once and may then be used in multiple detection paths. Pseudo-labeler 202, feature calculator 204, decision tree generator 210 and inspection recipe generator 214 may be part of a workflow processing system, and each may be independently scheduled and monitored. A workflow may be part of a project, where the project may include the hyperparameters for building a decision tree, thresholds, selections of image data sets etc. Further, multiple instances of pseudo-labeler 202, feature calculator 204, decision tree generator 210 and inspection recipe generator 214 may be executing at the same time, each processing different sets of data for different workflows. Details on a system for creating, scheduling, and monitoring such workflows are provided in co-filed, copending U.S. Provisional Patent Application Ser. No. 63/131,166, entitled "ACTIVE LEARNING MANAGEMENT SYSTEM FOR AUTOMATED INSPECTION SYSTEMS," which has been previously incorporated by reference.

Figure 6:
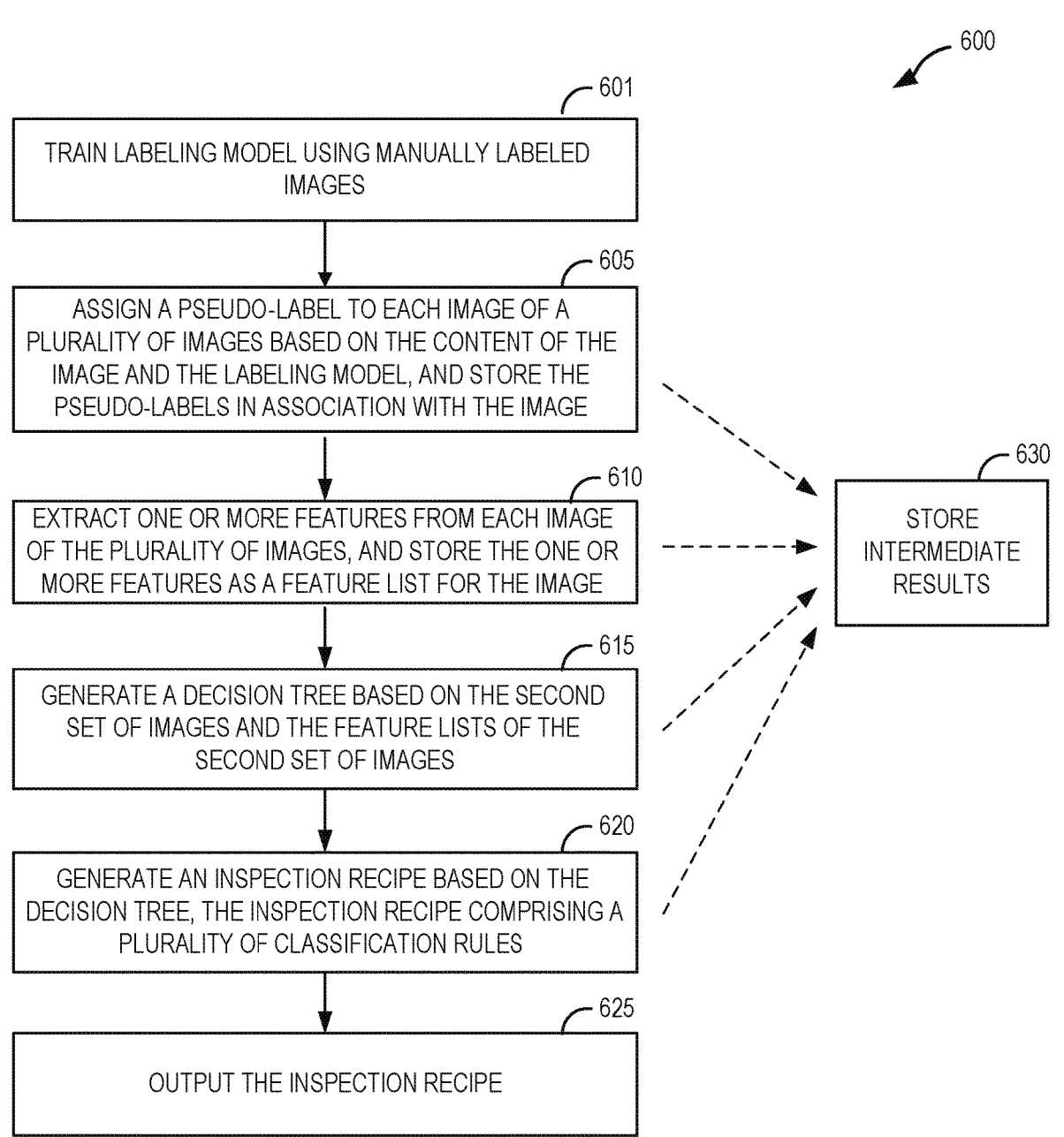
FIG. 6 is a flow diagram illustrating example operations for generating an inspection recipe, in accordance with one or more techniques of this disclosure.

FIG. 6 is a flow diagram illustrating example operations for generating an inspection recipe, in accordance with one or more techniques of this disclosure. A training system may receive a set of manually labeled images and train a labeling model using the manually labeled images (601). As an example, the label model may be a CNN. In some aspects, the manually labeled images may be a relatively small set of images (e.g., approximately 100 images). An inspection recipe generation system may assign a pseudo-label to each image of a plurality of images based on the content of the image and the labeling model, and store the pseudo-labeled images in a second set of images (605). Next, an inspection recipe generation system may extract one or more features from each image of the plurality of images, and store the one or more features as a feature list for the image (610). Next, an inspection recipe generation system may generate a decision tree based on the second set of images and the feature lists of the second set of images (615). Next, an inspection recipe generation system may generate an inspection recipe based on the decision tree, the inspection recipe comprising a plurality of classification rules (620). Next, an inspection recipe generation system may output the inspection recipe (625). Some of the operations above may be performed in a different order or in parallel with one another. For example, assigning a pseudo-label (605) and extracting features (610) from images may take place in parallel. Alternatively, features may be extracted from images and stored in transform database 208 prior to applying pseudo-labels to the images.

In some aspects, recipe generation system may store intermediate results at various stages of the workflow (630). For example, intermediate results may be stored during or after assignment of pseudo-labels to images. Intermediate results may be stored during or after extracting features form the images. Intermediate results may be stored during or after decision tree generation or recipe generation. The intermediate results may be interrogated to determine reasons for how the recipe generation system processed an image or generated the decision tree. Additionally, storing intermediate results can improve performance by allowing reuse of intermediate results. For example, images that have been already pseudo-labeled and have had features extracted may be reused when decision tree generation parameters are the only change. This avoid the need to extract features from the images, which can be expensive in terms of time and resources.

Figure 7:
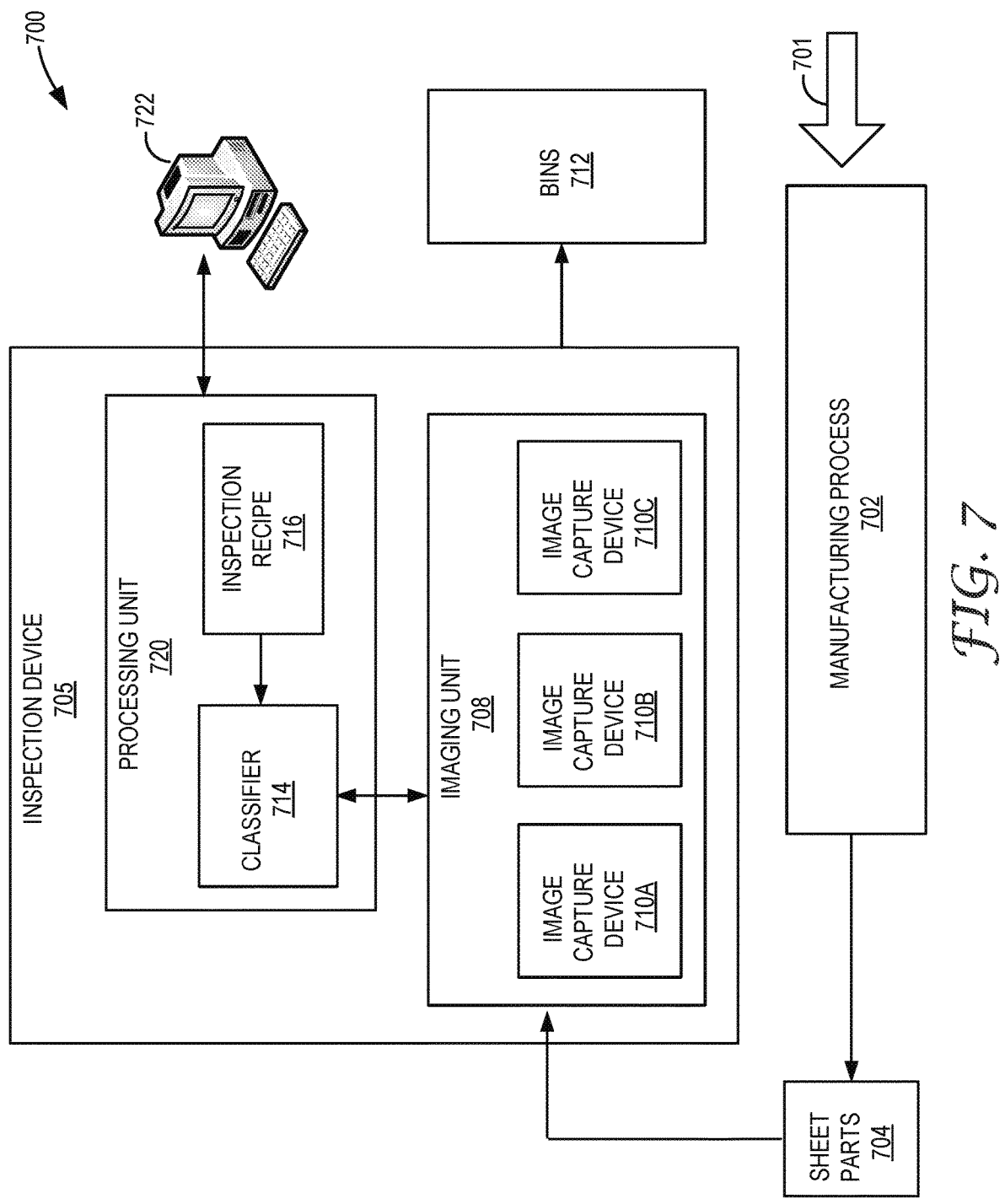
FIG. 7 is a block diagram illustrating a system for manufacturing a plurality of sheet parts, and for imaging and inspecting the plurality of sheet parts for defects, in accordance with at least one example technique described in this disclosure.

FIG. 7 is a block diagram illustrating a system for manufacturing a plurality of sheet parts, and for imaging and inspecting the plurality of sheet parts for defects, in accordance with at least one example technique described in this disclosure. In the example illustrated in FIG. 7, system 700 includes inputs 701, manufacturing process 702, sheet parts 704, inspection device 705, imaging unit 708, one or more image capture devices 710A-710C (collectively, "image capture devices 710"), bins 712, processing unit 720, and user interface 722.

Manufacturing process 702 as shown in FIG. 7 receives various inputs 701 (e.g., material, energy, people, and machinery) and produces an output including a plurality of sheet parts 704. Manufacturing process 702 is not limited to any particular type or form of manufacturing and is illustrative of any type of manufacturing process operable to produce sheet parts. In some examples, inputs 701 include a long continuous sheet of a roll good product (e.g., a polyester film (e.g., an optical film)), and sheet parts 704 may be parts made from the roll good product. Manufacturing process 702 may include partitioning individual portions of the long continuous sheet to create sheet parts 704. For example, sheet parts 704 may include pieces cut from the long continuous sheet. In some examples, sheet parts 704 include pieces of the long continuous sheet cut in the shape of an object (e.g., a mobile device, a laptop computer, a desktop computer, a television, or a window). Once produced by manufacturing process 702, sheet parts 704 may be applied to a surface of the respective object.

Sheet parts 704 may be substantially similar in shape, material composition, and thickness such that each sheet part of the plurality of sheet parts appears to be alike. In some embodiments, each sheet part of sheet parts 704 comprises a single layer of transparent or semi-transparent material or may include a plurality of layers of materials. Sheet parts 704 may comprise transparent or semi-transparent material intended to provide particular levels of light transmission, generally through the thickness dimension of sheet parts 704, for a particular wavelength of light or for a range of wavelengths of light. Sheet parts 704 may have various requirements related to the flatness of the top and/or bottom surfaces of the sheet parts, and/or related to the lack of defects.

During the manufacturing process 702, sheet parts 704 may accrue a variety of defects. In some examples, defects include particles, scuffs, scratches, dents, streaks, or impressions. Inspection device 705 may inspect sheet parts 704 as they move through imaging unit 708 and determine a classification for the sheet part. In some aspects, there may be two classification, one indicating that the sheet part has a defect, the other indicating that the sheet part is not defective. Other classifications are possible. For example, a classification may indicate that the part may need rework before it can be used.

System 700 may manufacture and inspect sheet parts 704 in an assembly line. In other words, after manufacturing process 702 creates sheet parts 704, the sheet parts may travel through inspection device 705. Subsequently, sheet parts 704 may be sorted into bins 712. Sheet parts 704 may continuously cycle through system 700 such that additional sheet parts enter inspection device 705 as newly inspected sheet parts exit inspection device 705 into bins 712. In some examples, a moving belt (e.g., a conveyor belt) continuously transports sheet parts 704 from an endpoint of manufacturing process 702 through inspection device 705 to bins 712.

Inspection device 705 may include imaging unit 708. In some examples, inspection device 705 includes an entry zone (not shown) for sheet parts 704 to enter inspection device 705. In some examples, the entry zone of inspection device 705 automatically receives a sheet part from a collection of sheet parts 704. For example, the entry zone of inspection device 705 may include a portion of a moving belt that transports sheet parts 704 from manufacturing process 702, enabling sheet parts 704 to enter inspection device 705. In other examples, sheet parts 704 may be assembled in a stack after the sheet parts are created by manufacturing process 702, and individual sheet parts of the stack of sheet parts may automatically and continuously dispense onto the entry zone of inspection device 705. Additionally, or alternatively, inspection device 705 may include a selection member (not shown) configured to select an individual sheet part from the stack of sheet parts 704 and place the individual sheet part onto the entry zone of inspection device 705. In other examples, a device operator may manually place sheet parts 704 on the entry zone.

Imaging unit 708 may include one or more image capture devices 710. Image capture devices 710 may be cameras or other components configured to capture image data representative of sheet parts 704 within imaging unit 708. In other words, the image data captures a visual representation of an environment, such as sheet parts 704 within imaging unit 708. Image capture devices 710 may include components capable of capturing image data, such as a video recorder, an infrared camera, a CCD (Charge Coupled Device) array, or a laser scanner.

In some examples, image capture devices 710 can be conventional imaging devices that are capable of reading some or all of a moving sheet part and providing output in the form of a digital data stream. Image capture devices 710 may capture images corresponding to a sheet part of sheet parts 704. Image capture devices 710 may be cameras that directly provide a digital data stream or an analog camera with an additional analog to digital converter. Additionally, image capture devices 710 may include other sensors, such as, for example, laser scanners and linescan cameras.

In some examples, there can be one image capture device (e.g., image capture device 710A) that can be used to capture image data. In some examples, there can be multiple image capture devices (e.g., image capture devices 710A-710C) that each capture image data for a sheet part. In some aspects, the cameras may capture image data for a sheet part from different angles or different views. In such examples, imaging unit 708 or processing unit 720 can create composite image data from the image data of each of the image capture devices 710. As used herein, image data can include image data captured from a single image capture device and composite image data of a sheet part captured from multiple image capture devices.

After imaging unit 708 captures an image of a sheet part, inspection device 705 may output image data to processing unit 720. Processing unit 720 may be configured to assess a quality of the sheet part. For example, processing unit 720 can include a classifier 714 that utilizes and inspection recipe 716 to classify a sheet part according to the image data. Inspection recipe 716 may be generated in whole or in part using the techniques described herein. Classifier 714 may apply the inspection recipe to the image data to determine if the image data indicates the sheet part 704 is defective and output classification data indicative of whether or not defects in the sheet part are detected in the image data. Processing unit 720 can output data that inspection device 705 can use to determine which of bins 712 is to be used to receive the sheet part. One of bins 712 may be used to hold sheet parts 704 classified as having a defect, while another of bins 712 may be used to hold sheet parts 704 that are not classified as having a defect.

In some examples, user interface 722 allows a user to control system 700. User interface 722 includes any combination of a display screen, a touchscreen, buttons, speaker inputs, or speaker outputs. In some examples, user interface 722 is configured to power on or power off any combination of the elements of system 700 and provide configuration information for processing unit 720.

In some examples, the output zone of inspection device 705 automatically routes a classified sheet part into a respective bin. Additionally, or alternatively, system 700 may indicate a classification of a sheet part and a device operator may manually sort the sheet part into a respective bin. In the examples in which the output zone automatically sorts sheet parts into respective bins 712, inspection device 705 may include a set of diverging tracks at the output zone, where each track of the diverging tracks leads to a bin of the plurality of bins 712.

Figure 8:
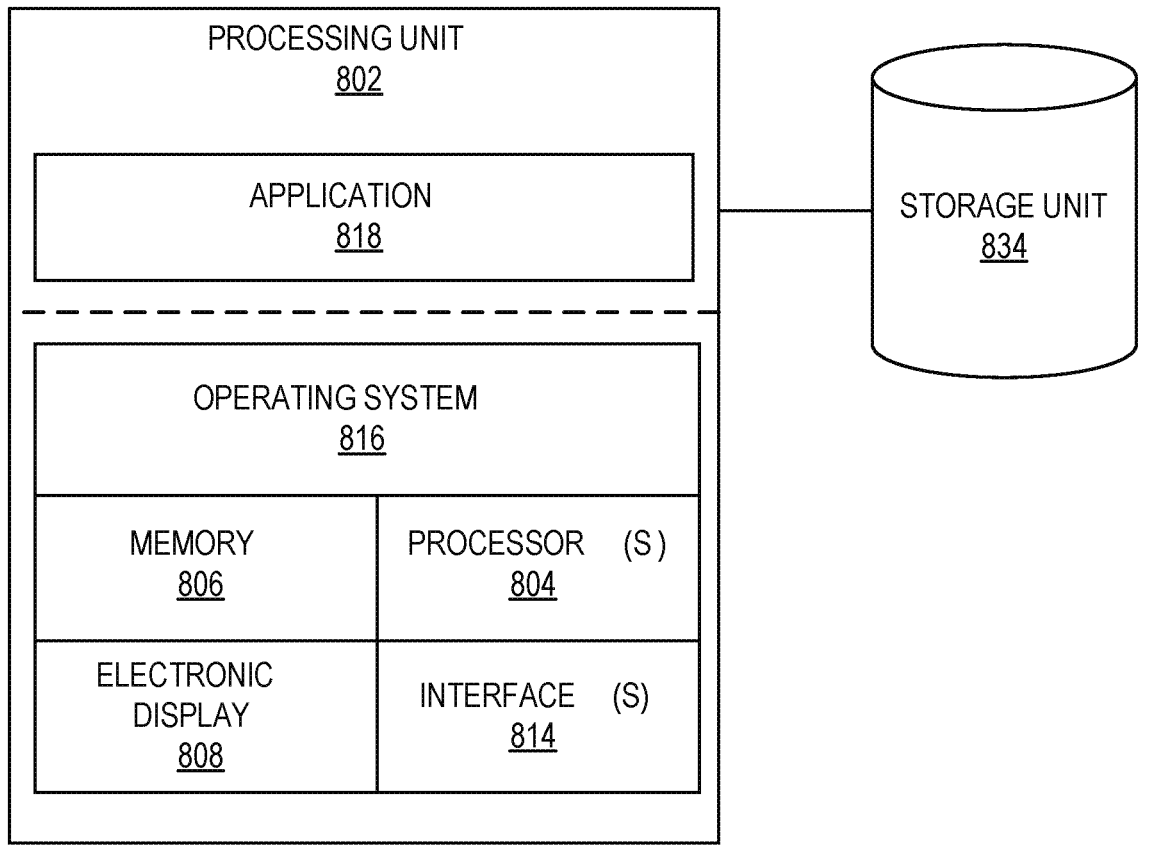
FIG. 8 is an illustration depicting an example processing unit that operates in accordance with the techniques of the disclosure.

FIG. 8 is an illustration depicting an example processing unit 802 that operates in accordance with the techniques of the disclosure. The processing unit 802 provides a hardware environment for execution of application 818 that may be part of a workflow to generate one or more inspection recipes according to the techniques described herein. For example, application 818 may be any of pseudo-labeler 202, feature calculator 204, decision tree generator 210 and/or inspection recipe generator 214 (FIG. 2).

In this example, processing unit includes processing circuitry that may include one or more processors 804 and memory 806 that, in some examples, provide a computer platform for executing an operating system 816, which may be a real-time multitasking operating system, for instance, or other type of operating system. In turn, operating system 816 provides a multitasking operating environment for executing one or more software components such as application 818. Processors 804 are coupled to one or more I/O interfaces 814, which provide I/O interfaces for communicating with devices such as a keyboard, controllers, display devices, image capture devices, other computing systems, and the like. Moreover, the one or more I/O interfaces 814 may include one or more wired or wireless network interface controllers (NICs) for communicating with a network. Additionally, processors 804 may be coupled to electronic display 808.

In some examples, processors 804 and memory 806 may be separate, discrete components. In other examples, memory 806 may be on-chip memory collocated with processors 804 within a single integrated circuit. There may be multiple instances of processing circuitry (e.g., multiple processors 804 and/or memory 806) within processing unit 802 to facilitate executing applications in parallel. The multiple instances may be of the same type, e.g., a multiprocessor system or a multicore processor. The multiple instances may be of different types, e.g., a multicore processor with associated multiple graphics processor units (GPUs). In some examples, processor 804 may be implemented as one or more microprocessors, digital signal processors (DSPs), application specific integrated circuits (ASICs), field-programmable gate array (FPGAs), or equivalent discrete or integrated logic circuitry, or a combination of any of the foregoing devices or circuitry.

The architecture of processing unit 802 illustrated in FIG. 8 is shown for example purposes only. Processing unit 802 should not be limited to the illustrated example architecture. In other examples, processing unit 802 may be configured in a variety of ways. Processing unit 802 may be implemented as any suitable computing system, (e.g., at least one server computer, workstation, mainframe, appliance, cloud computing system, and/or other computing system) that may be capable of performing operations and/or functions described in accordance with at least one aspect of the present disclosure. As examples, processing unit 802 can represent a cloud computing system, server computer, desktop computer, server farm, and/or server cluster (or portion thereof). In other examples, processing unit 802 may represent or be implemented through at least one virtualized compute instance (e.g., virtual machines or containers) of a data center, cloud computing system, server farm, and/or server cluster. In some examples, processing unit 802 includes at least one computing device, each computing device having a memory 806 and at least one processor 804.

Storage units 834 may be configured to store information within processing unit 802 during operation. Storage units 834 may include a computer-readable storage medium or computer-readable storage device. In some examples, storage units 834 include at least a short-term memory or a long-term memory. Storage units 834 may include, for example, random access memories (RAM), dynamic random access memories (DRAM), static random access memories (SRAM), magnetic discs, optical discs, flash memories, magnetic discs, optical discs, flash memories, or forms of electrically programmable memories (EPROM) or electrically erasable and programmable memories (EE-PROM).

In some examples, storage units 834 are used to store program instructions for execution by processors 804. Storage units 834 may be used by software or applications 818 running on processing unit 802 to temporarily store information during program execution. For example, storage unit 834 may store some or all of transform database 208, decision tree database 212 and inspection recipes 216 (FIG. 2). Storage unit 834 of processing unit 802 may also store configuration parameters, including hyperparameters, to control the operation of application 818 and other components of processing unit 802.

The techniques described in this disclosure may be implemented, at least in part, in hardware, software, firmware or any combination thereof. For example, various aspects of the described techniques may be implemented within at least one processor, including at least one microprocessor, DSP, ASIC, FPGA, and/or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform at least one of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with at least one module and/or unit may be performed by separate hardware or software components or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method (e.g., when the instructions are executed). Computer readable storage media may include RAM, read only memory (ROM), programmable read only memory (PROM), EPROM, EEPROM, flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method for generating an inspection recipe, the method comprising: assigning, by processing circuitry, a pseudo-label to each image of a plurality of images based on content of the image and a labeling model, and storing the pseudo-label in association with the image;

extracting, by the processing circuitry, one or more features from each image of the plurality of images, and storing the one or more features as a feature list for the image;

generating, by the processing circuitry, a decision tree based on the stored pseudo-labels and the stored feature lists;

generating, by the processing circuitry, an inspection recipe based on the decision tree, the inspection recipe comprising a plurality of classification rules; and outputting the inspection recipe.

2. The method of claim 1, wherein generating the inspection recipe comprises:

traversing a path from a leaf node of the decision tree to a root node of the decision tree, the path comprising one or more rule nodes; and generating rules for the inspection recipe based on the one or more rule nodes in the traversed path, wherein each of the rules defines criteria for acceptance or rejection of the image based on one or more features.

3. The method of claim 2, wherein generating a rule comprises generating a filter configured to receive image data and determine if the image data matches filter criteria determined according to the rule.

4. The method of claim 1, wherein the decision tree comprises a plurality of leaf nodes, each leaf node of the plurality of leaf nodes having a classification comprising one of a first classification or a second classification, and wherein the method further comprises:

determining a plurality of positive paths, each positive path comprising a set of rule nodes from a leaf node having the first classification to a root node of the decision tree, wherein the plurality of positive paths do not include leaf nodes having the second classification; and determining, for each positive path of the plurality of positive paths, a rule component comprising an intersection of rules determined according to the rule nodes in the positive path;

wherein the inspection recipe comprises a union of the rule components.

5. The method of claim 1, wherein outputting the inspection recipe comprises deploying the inspection recipe to an inspection system of a production line.

6. The method of claim 1, further comprising:

binarizing each image, and wherein extracting one or more features from each image comprises determining zero or more blobs within the image, wherein the feature list for the image comprises features associated with the zero or more blobs in the image.

7. The method of claim 1, wherein generating the decision tree comprises generating a binary decision tree, wherein each leaf node of the decision tree corresponds to one of a first classification or a second classification.

8. The method of claim 1, wherein each image of the plurality of images comprises an image of a web portion, a sheet part, or a piece part.

9. The method of claim 1, further comprising:

obtaining a set of manually labeled images, wherein the number of manually labeled images is less than the number of the plurality of images; and training the label model based on the manually labeled images.

10. The method of claim 1, further comprising:

storing intermediate results during one or more of the assigning the pseudo-labels, the extracting of the one or more features from each image of the plurality of images, and the generating the decision tree.

11. A system for generating an inspection recipe, the system comprising:
a pseudo-labeler comprising processing circuitry configured to assign a pseudo-label to each image of a plurality of images based on the content of the image and a labeling model, and store the pseudo-label in association with the image;
a feature extractor comprising processing circuitry configured to extract one or more features from each image of the plurality of images, and store the one or more features as a feature list for the image;
a decision tree generator comprising processing circuitry configured to generate a decision tree based on the stored pseudo-labels and the stored feature lists; and
an inspection recipe generator configured to generate an inspection recipe based on the decision tree and to output the inspection recipe, the inspection recipe comprising a plurality of classification rules.

12. The system of claim 11, wherein the decision tree generator is further configured to:
traverse a path from a leaf node of the decision tree to a root node of the decision tree, the path comprising one or more rule nodes; and
generate rules for the inspection recipe based on the one or more rule nodes in the traversed path, wherein each of the rules defines criteria for acceptance or rejection of the image based on one or more features.

13. The system of claim 12, wherein each rule comprises a filter configured to receive image data and determine if the image data matches filter criteria determined according to the rule.

14. The system of claim 11, wherein the decision tree comprises a plurality of leaf nodes, each leaf node of the plurality of leaf nodes having a classification comprising one of a first classification or a second classification, and wherein the decision tree generator is further configured to:
determine a plurality of positive paths, each positive path comprising a set of rule nodes from a leaf node having the first classification to a root node of the decision tree, wherein the plurality of positive paths do not include leaf nodes having the second classification; and
determine, for each positive path of the plurality of positive paths, a rule component comprising an intersection of rules determined according to the rule nodes in the positive path;
wherein the inspection recipe comprises a union of the rule components.

15. The system of claim 11, wherein the inspection recipe is deployed to an inspection system of a production line.

16. The system of claim 11, wherein to transform each image comprises to binarize each image, and
wherein to extract the one or more features from each image comprises to determine zero or more blobs within the image, wherein the feature list for the image comprises features associated with the zero or more blobs in the image.

17. The system of claim 11, wherein the decision tree comprises a binary decision tree, wherein each leaf node of the decision tree corresponds to one of a first classification or a second classification.

18. The system of claim 11, wherein each image of the plurality of images comprises an image of a web portion, a sheet part, or a piece part.

19. A computer-readable storage medium having stored thereon instructions executable by one or more processors to cause the one or more processors to:
assign a pseudo-label to each image of a plurality of images based on content of the image and a labeling model, and store the pseudo-label in association with the image;
extract one or more features from each image of the plurality of images, and store the one or more features as a feature list for the image;
generate a decision tree based on the stored pseudo-labels and the stored feature lists;
generate an inspection recipe based on the decision tree, the inspection recipe comprising a plurality of classification rules; and
output the inspection recipe.

20. The computer-readable storage medium of claim 19, wherein the decision tree comprises a plurality of leaf nodes, each leaf node of the plurality of leaf nodes having a classification comprising one of a first classification or a second classification, and wherein the instructions further cause the one or more processors to:
determine a plurality of positive paths, each positive path comprising a set of rule nodes from a leaf node having the first classification to a root node of the decision tree, wherein the plurality of positive paths do not include leaf nodes having the second classification; and
determine, for each positive path of the plurality of positive paths, a rule component comprising an intersection of rules determined according to the rule nodes in the positive path;
wherein the inspection recipe comprises a union of the rule components.

* * * * *